Oct. 10, 1933.  N. B. LUND  1,930,128
RIGID FILTER MEDIUM
Filed Oct. 6, 1930  2 Sheets-Sheet 1

Inventor
NELS B. LUND,
By Arthur Middleton
Attorney

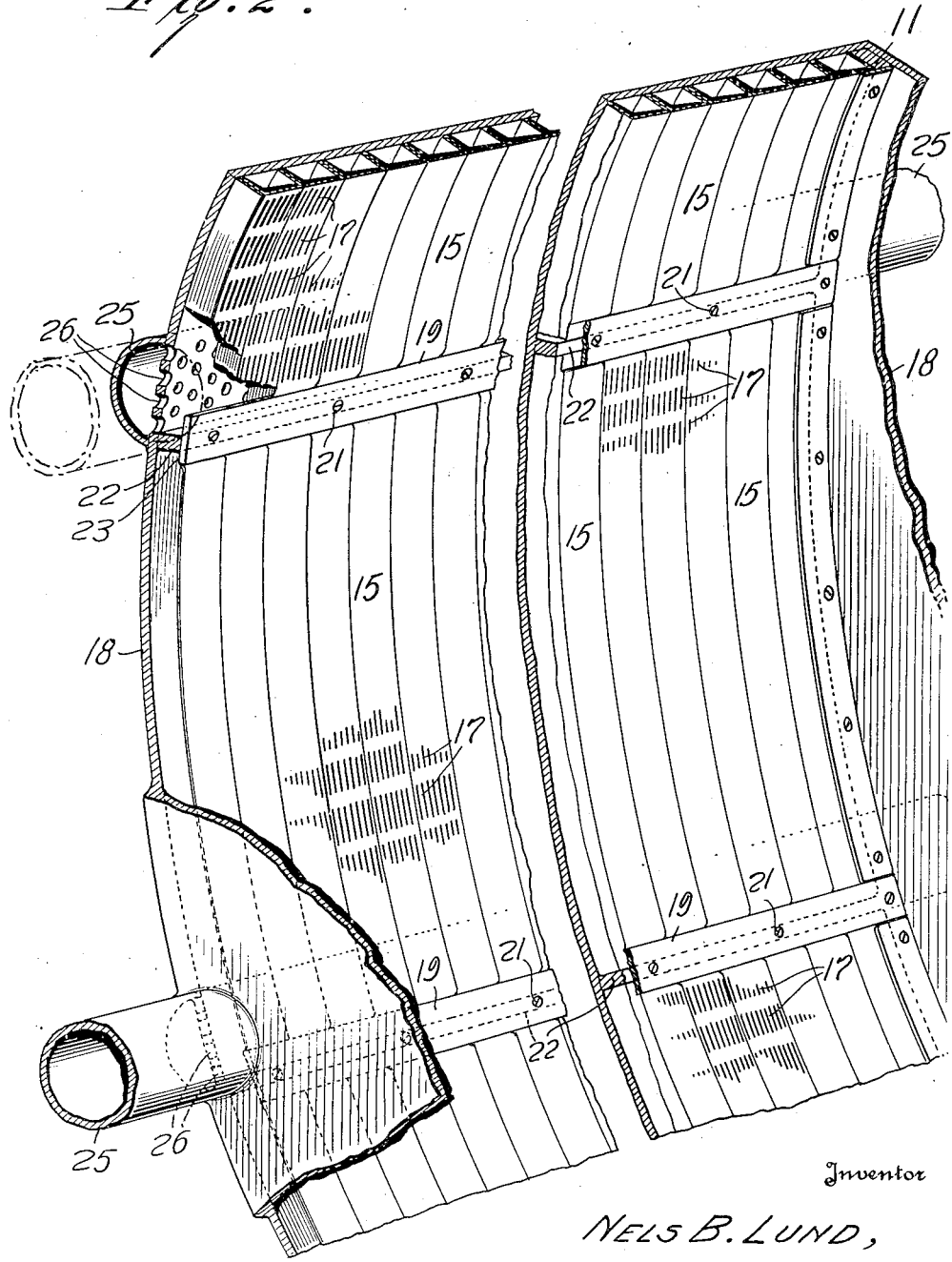

Patented Oct. 10, 1933

1,930,128

UNITED STATES PATENT OFFICE 1,930,128

RIGID FILTER MEDIUM

Nels B. Lund, Seaford, N. Y., assignor, by mesne assignments, to The Dorr Company, Inc., New York, N. Y., a corporation of Delaware Application October 6, 1930. Serial No. 486,645

3 Claims. (Cl. 210—169)

This invention relates to filter mediums for use in rotary filters. Its object is to devise a rigid filter medium having all the advantages of the present more or less flexible woven or cloth mediums but which will have sufficient strength to withstand, without breaking or splitting, the stresses of alternate suction and pressure thereon. Also to be stiff enough to render unnecessary the usual stiffening and supporting backing plates.

To meet the objections to the woven type filter mediums, my aim has been to devise a filter medium of some fairly ductile metal which could be perforated to permit the filtrate to pass therethrough, and to be corrugated or crimped to provide stiffening ridges or ribs thereon so that of itself, without reenforcement, it can withstand the strain of alternate suction and blowback. Other details naturally have suggested themselves to me as I worked out my invention and these I have disclosed hereinafter.

Figure 1:
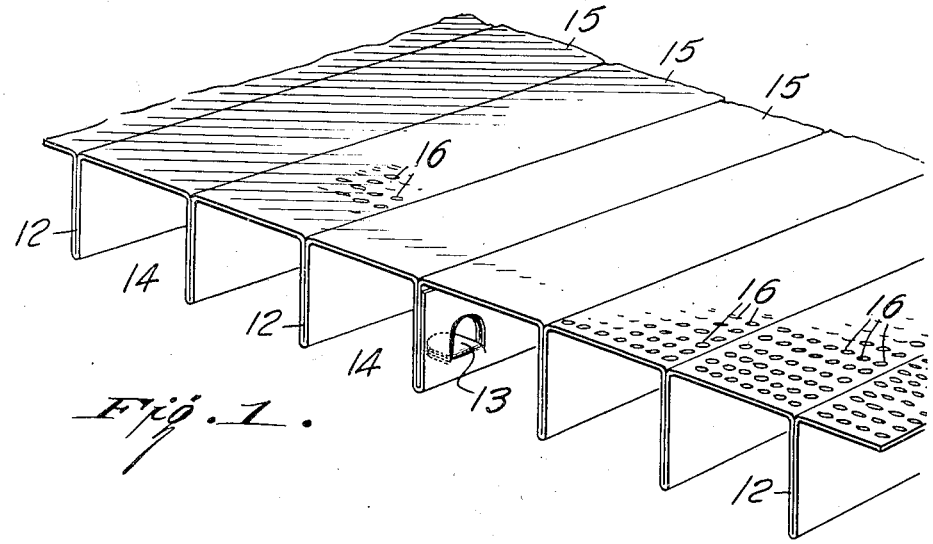
Figure 3:
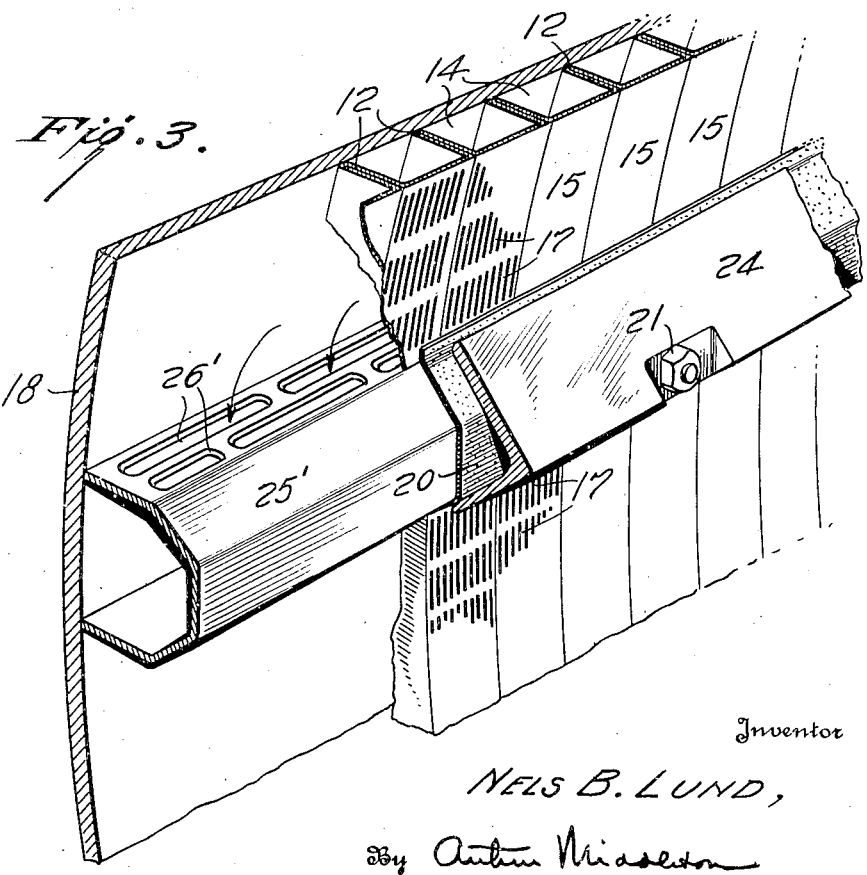

For the purpose of illustrating my invention I have accompanied this specification with drawings showing an embodiment of my invention in which Figure 1 shows a perspective view of a portion of one of my plates Figure 2 is a partial perspective view with parts broken away showing my filter panel in place in a filter Figure 3 shows a modified form of clamp for holding the panels in a filter drum.

The type of filter for which I have devised my new filtering medium is of the continuous rotary drum type of which there is one class where the pulp to be filtered is external of the drum or another class in which the pulp to be filtered is internal of the drum. My particular preference is for the internal type, so I shall describe my filtering medium or panel in use in the latter.

Normally in such an internal rotary drum filter, woven filter cloth of either fabric or wire is commonly used. As this has insufficient inherent stiffness, it is necessary to provide between it and the shell of the drum, a backing plate. And again, some means also has to be provided for spacing the backing plate from the shell of the drum to make room for the filtrate to flow to its outlet manifold, or pipe. Such a filter is so well known that no view of it is shown in the drawings.

To eliminate the backing plate and the spacing means, I have devised a fairly rigid metallic filtering plate or panel 11 formed with integral corrugations or ribs 12 by simply bending the metal back upon itself such as by crimping. Punched out tongues 13 may also be used to better stiffen the ribs 12. These ribs have channels 14 between them.

The areas 15 of the plate between the ribs 12, I perforate in either one of two ways, namely, by punching more or less round apertures 16 therethrough, or by cutting therethrough slotted openings 17. I prefer however to use slots, which may be positioned in any suitable or desirable relation to each other. If the slots as originally made are too wide, I find they can be made smaller or narrower by re-rolling the plate.

The panels 11 are longer than they are wide and generally are applied to the filter-drum 18 by extending longitudinally thereof. They are given the same curvature as the drum and so can be applied directly against the drum 18 by having their ribs 12 contact directly therewith, for the ribs have the same curvature as the plates 11 and extend in the direction of curvature thereof, namely, they extend circumferentially of the drum. Therefore, no other element needs to be interposed between them and the drum for they are stiff enough to withstand the stresses and strains set up in them due to the alternate suction and blow-back put upon them in the filtering operation. The ribs 12 have the combined function of stiffening or re-enforcing them against flexing and also space their filtering surface from the drum.

The panels are secured in place in or to the drum by means of clamping strips 19 which overlap the adjacent edges of two panels 11. The clamps 19 are preferably provided with a gasket 20 between them and the plates 11 to prevent injury to the plates and also to make a tight joint. The clamps 19 are made fast in any desirable way to the drum such as by bolts 21, and a spacing block 22.

The clamping strips 19 may be flat and may be sunk into appropriate or corresponding recesses 23 made in edges of the panels 11 so that the upper surface of the clamping strip is flush with the surface of the panels. By presenting such a flush filtering surface, a doctor blade or other scraper may be used to facilitate discharge of the cake from the panels.

In filtering some materials such as paper pulp, there is a tendency for the cake to bridge the joint between adjacent filter panels with the result that when cake is removed from one panel, it also starts peeling off the cake on an adjacent panel. To overcome this bridging of the cake from one panel to the next, the clamping strips may be made of an angle bar 24 substantially V-shape in cross-section to extend out of the approximate plane of two adjacent filter panels far enough to prevent the cake on the two panels from becoming continuous. When it is desired to use this form of clamping plate 24, the outlet manifold can conveniently be modified as shown at 25' with its slotted openings 26 to support the clamp 24 in a more elevated position.

As the ribs 12 and the channels 14 formed between them, extend circumferentially around the drum 18, they serve as ducts or conduits for directing the filtrate passing through the panels to the usual filtrate outlet manifold or pipe 25, which facilitates filtrate discharge. Perforations or slots 26 are provided in the outlet manifold 25 so that filtrate from the channels 14 can readily pass thereinto.

In practice, my filter panels or plates may be substituted in existing drum filters for the present panels of fabric or wire-cloth without going to the expense of removing the backing plates and corrugated or other spacing members. However, in newly built filters, the backing and spacing members can be eliminated.

In operation, the filter panels or elements of my invention may be secured in usual position in a rotary drum filter. The operations of alternately applying suction and blow-back may also be as usual. Cake is built up on my filter panel and filtrate passes therethrough, all as usual except that I find my new panel to be very effective, and not being flexed, appears to have almost indefinite life. The channels 14 aid greatly in hastening passage of the filtrate to the outlet manifold and there seems to be no tendency for filtrate to lag or collect on the back of my filter panel.

While I have shown one embodiment of my invention, it has been shown in an illustrative sense and not a limiting one so modifications are entirely possible, and in fact contemplated without departing from the spirit and scope of my invention. For example, my filter plate may be used in other types of filters than rotary drum ones.

I claim:

1. A rotary filter having a drum, a plurality of adjacent longitudinally extending filter elements of punched ductile metal, re-inforcing ribs thereon extending circumferentially of said drum, and a filtrate outlet manifold supported from said drum transversely of said ribs, said reinforcing ribs forming conduits for guiding filtrate to said manifold.

2. A rotary filter having a drum, a plurality of adjacent longitudinally extending filter elements of punched metal, reinforcing ribs theron extending circumferentially of said drum, a filtrate outlet manifold supported from said drum transversely of said ribs connected with each filter element, the reinforcing ribs of each element forming conduits for guiding filtrate to the manifold connected with said element, and stop means for preventing filtrate from flowing beyond said manifold into an adjacent filter element.

3. A rotary filter having a drum and a plurality of adjacent combined filter devices each comprising a filtrate outlet manifold, a filtering panel of punched metal extending longitudinally of said drum, reinforcing ribs on said panel extending circumferentially of said drum, said ribs forming conduits for guiding filtrate to said manifold, a blocking member closing off the ends of said panel, and means for securing said panel in place on said drum.

NELS B. LUND.